United States Patent [19]

Ishida et al.

[11] Patent Number: 4,700,172
[45] Date of Patent: Oct. 13, 1987

[54] LIGHTING CONTROL APPARATUS FOR SIGNAL LIGHTS

[75] Inventors: Hideo Ishida, Nagoya; Ryoichi Tanaka, Aichi; Katsuhito Atsumi, Okazaki, all of Japan

[73] Assignee: Nippondenso Co., Ltd., Kariya, Japan

[21] Appl. No.: 678,796

[22] Filed: Dec. 5, 1984

[30] Foreign Application Priority Data

Dec. 7, 1983 [JP] Japan ................. 58-229770

[51] Int. Cl.$^4$ .............................................. B60Q 1/46
[52] U.S. Cl. ................................. 340/81 R; 340/642; 338/114
[58] Field of Search ...................... 340/81 R, 641, 642; 338/333, 114, 195, 114; 51/326; 307/10 LS

[56] References Cited

U.S. PATENT DOCUMENTS

| | | | |
|---|---|---|---|
| 1,315,579 | 9/1919 | Rojas | 338/114 X |
| 2,261,667 | 11/1941 | Stroszeck | 338/333 X |
| 2,597,674 | 5/1952 | Robbins | 338/195 X |
| 3,414,864 | 12/1968 | Barrington | 338/195 X |
| 4,150,359 | 4/1979 | Mizuno et al. | 340/81 R |
| 4,260,985 | 4/1981 | Hayden | 340/641 X |
| 4,266,212 | 5/1981 | Mizuno | 340/81 R |
| 4,345,235 | 8/1982 | Riley | 338/195 X |
| 4,348,655 | 9/1982 | Goertler et al. | 340/641 X |
| 4,349,810 | 9/1982 | Kugo et al. | 340/642 X |
| 4,504,820 | 3/1985 | Krumrein | 340/642 X |

FOREIGN PATENT DOCUMENTS 57-80705  5/1982  Japan .

OTHER PUBLICATIONS

*Microelectronics*, by Jacob Millman, ©1979, p. 8, published by McGraw-Hill Book Co.

*Primary Examiner*—James L. Rowland
*Assistant Examiner*—Jeffery A. Hofsass
*Attorney, Agent, or Firm*—Cushman, Darby & Cushman

[57] ABSTRACT

An apparatus for detecting, for example, the disconnection of signal lights such as flashers for vehicles and for warning of this disconnection has a detecting resistor element for converting an ON current of the signal lights into a voltage signal. The voltage signal detected by this resistor element is compared with a reference voltage which is set at a discrimination/oscillation control circuit so as to detect if the detecting voltage signal is lower than the reference voltage. When such a state is detected, the oscillation frequency of an oscillator for changing the flashing frequency of the signal light is doubled. The disconnection of the lights can be detected by observing the frequency of the flashing signal. The detecting resistor element consists of a resistive wiring formed of a resistive material which is processed so as to have a smaller resistance than desired. After the resistive wiring is connected to the discrimination/oscillation control circuit by welding or the like, the resistive wiring is depressed at least once, thereby decreasing the cross-sectional area thereof and allowing the resistance of the resistive wiring to match the reference voltage of the control circuit. The resistance of the resistive wiring is thus increased.

14 Claims, 8 Drawing Figures

LIGHTING CONTROL APPARATUS FOR SIGNAL LIGHTS

BACKGROUND OF THE INVENTION

The present invention relates to a lighting control apparatus for signals such as flashers, brake lights and the like which are mounted on vehicles so as to be displayed to inform a driver when one of the signals is malfunctioning.

Vehicles have a variety of flasher lights or blinkers for indicating to a third party when a driver wants to make a right or left turn. Vehicles also have brake lights for signalling to a third party that the driver is applying the brakes and so is about to slow down or stop.

These signals such as flashers and brake lights are designed to indicate the driving state of the vehicle, and it is important for safe driving that all the lights be free from disconnection and function properly. For this reason, when a malfunction such as disconnection of the lamps occurs, various signalling means for quickly alerting a driver have been developed.

For example, a resistor element for detecting a value of an ON current is connected in series to a circuit of the ON current supplied to the signal lights, and a voltage generated across the two ends of this resistor element is detected so as to determine the value of the ON current. When a decrease in the ON current is detected, it is determined that at least one of a plurality of signal lights is disconnected.

In such a means for detecting the disconnection of a signal light, the resistance of the resistor element in which the ON current flows must correspond to a reference level set at a discrimination circuit which detects changes in the voltage generated in the resistor's element portion.

The discrimination circuit comprises a reference voltage setting circuit, in which at least two resistor elements are connected in series for setting the voltage of a connecting point of these two resistor elements as a reference voltage, and a comparator for comparing the reference voltage and a voltage signal generated in a resistor element portion to which the ON current is supplied. Therefore, in order to reliably detect the disconnection of the signals in this circuit, the voltage generated in the resistor element portion must be properly set with respect to the reference voltage. For this reason, the detecting resistor circuit and the resistor circuit for setting the reference voltage should respectively comprise a combination of a plurality of resistor elements or a variable resistor element.

However, since the resistor elements constituting the detecting resistor circuit are connected to the discrimination circuit by, for example, welding, it is difficult to set a specific resistance at a connecting portion of the detecting resistor elements. Therefore, when such a control apparatus for signal lights is designed, the resistances of the resistor elements must be adjusted so as to match the value of the reference voltage which is set in the discrimination circuit after connecting the detecting resistor elements to a circuit board comprising the discrimination circuit.

SUMMARY OF THE INVENTION

It is an object of the present invention to provide a lighting control apparatus for signal lights wherein a resistance of a detecting resistor element for converting a current value which is supplied to the signals as a voltage signal can be properly and easily adjusted to correspond to a reference voltage generated in a reference voltage setting circuit provided in a discrimination circuit portion for discriminating the detected voltage.

It is another object of the present invention to provide a lighting control apparatus for signal lights wherein the detecting resistor element is connected to the discrimination circuit at the same time the resistance of the detecting resistor element is adjusted according to the reference voltage which is set in the discrimination circuit so as to satisfactorily detect the disconnection of the signal lights.

It is still another object of the present invention to provide a lighting control apparatus for signal lights wherein the resistance of the detecting resistor element can be adjusted after the entire apparatus is assembled.

In the lighting control apparatus for signal lights according to the present invention, a detecting resistor element for generating a voltage signal corresponding to that of the ON current supplied to the signal lights is series-connected to an ON current circuit of the signal lights. This voltage signal, detected by the detecting resistor element, is compared with a reference voltage which is set in a discrimination circuit so as to detect changes in the ON current, thereby discriminating and indicating the disconnection of the signal lights. In this case, since the detecting resistor element consists of wiring formed of a resistive material, one or more portions of the resistive wiring are depressed so as to decrease the cross-section of this wiring, thereby enabling continual readjustment of the resistance of the resistor element. In the lighting control apparatus of the signal lights having such a configuration, the discrimination circuit portion including the reference voltage setting means is mounted on a circuit board, and a switching circuit such as a relay for controlling signal lights such as the flashers is connected thereto. Thereafter, the detecting resistor element can be connected to the circuit board. In other words, the resistance of the resistor element can be adjusted after all the desired connections are completed. Because of this, the resistance which is most suitable for detecting a disconnection of the signal lights can be set. Therefore, a complex resistance adjusting circuit is not needed and the resistance matching state can be easily obtained. Also, when an adjustment of the resistor element is performed using the depressions in the resistive wiring in order to change the cross-section, the formation of metal dust is prevented, thus avoiding the fouling of the mechanical contacts and the production of defective apparatuses.

DETAILED DESCRIPTION OF THE PREFERRED EMBODIMENTS

Figure 1:
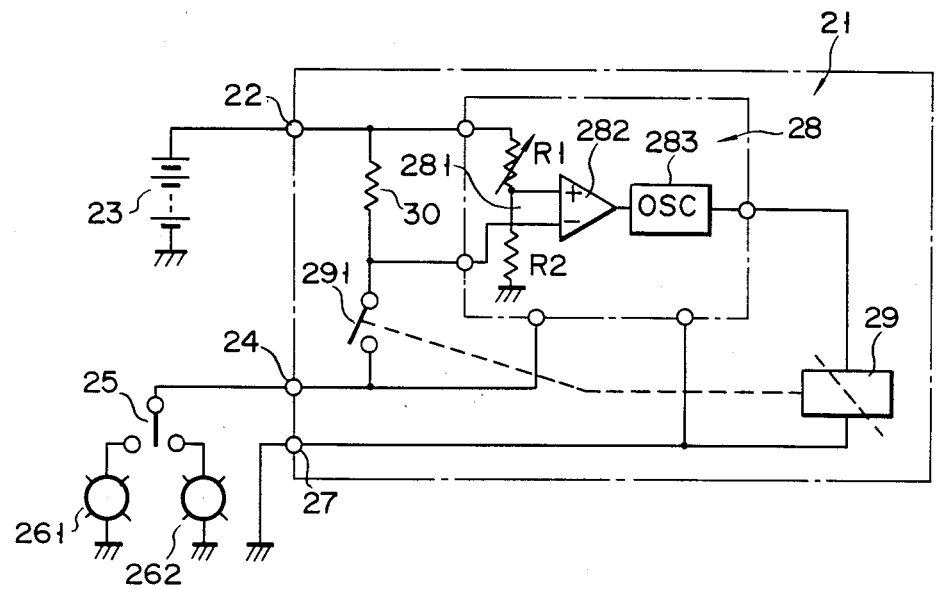
FIG. 1 is a view showing a circuit configuration of a lighting control apparatus for signal lights according to a first embodiment of the present invention.

In FIG. 1, a battery 23 is connected to a terminal 22 of a flasher unit 21. A switch 25 for selecting turn signals is connected to a terminal 24 of the unit 21. Turn signals 261 and 262 are connected to the switch 25. One of the signals 261 and 262 is selected by the switch 25 and an ON current is supplied to the selected signal. The switch 25 is usually set at a neutral position and selects either signal 261 and 262 through the operation of a turn signal lever. One terminal 27 of the unit 21 is a ground terminal, and is connected to a ground circuit.

Figure 2:
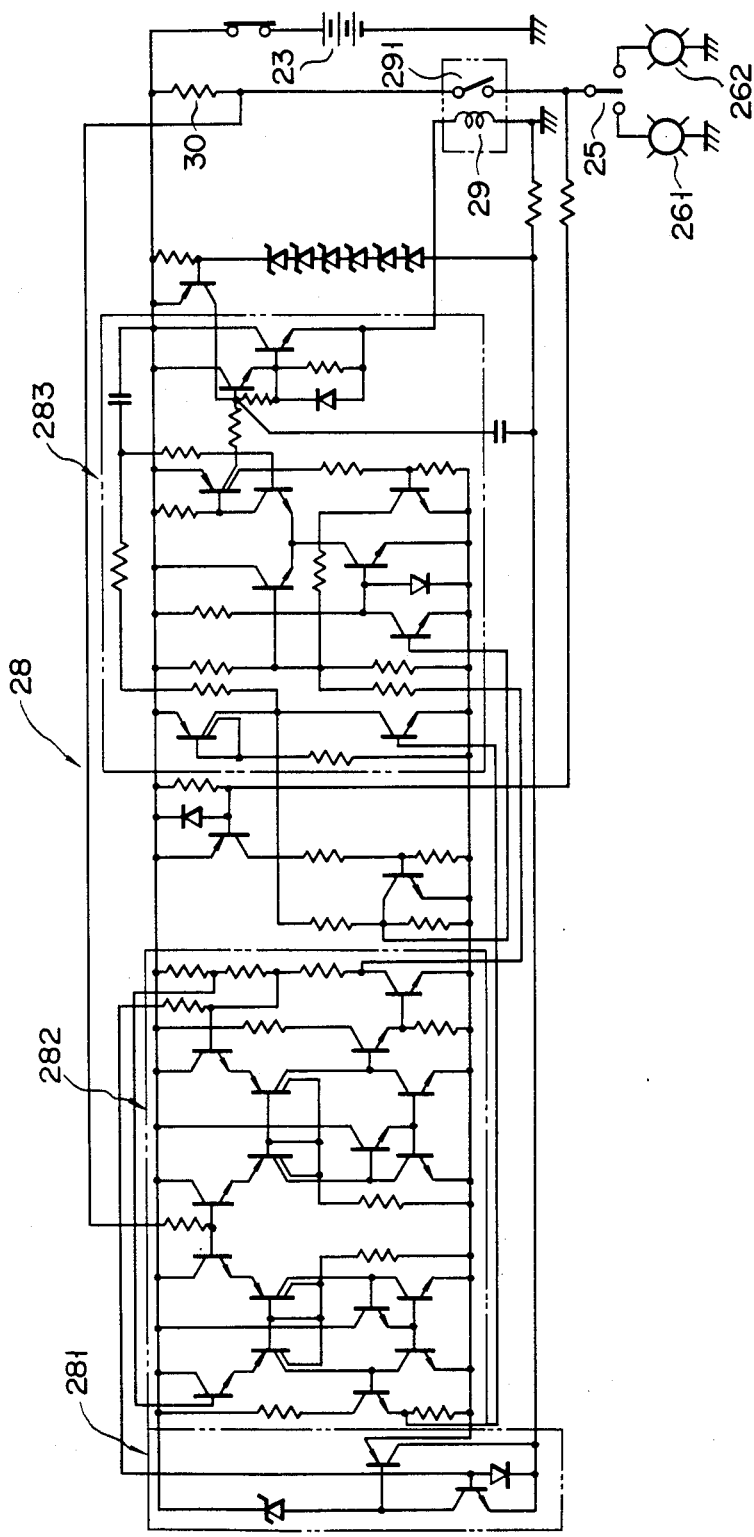
FIG. 2 is a detailed circuit diagram of discrimination and oscillation control circuits including a discrimination means.

The flasher unit 21 comprises a discrimination/oscillation control circuit 28 which is mounted on a single circuit board. The control circuit 28 comprises a reference voltage setting circuit 281 for dividing voltage from the battery 23 using the resistor elements R1 and R2; a comparator 282 for comparing a reference voltage from the reference voltage setting circuit 281 with an input detection voltage, and for changing the level of an output signal therefrom when the level of the input detection voltage is lower than that of the reference voltage; and an oscillator 283 for varying an oscillation frequency in correspondence with changes in the level of the output signal from the comparator 282. This circuit is shown in FIG. 2 in more detail and has been reported in U.S. Pat. No. 4,266,212, and can thus be more clearly understood by a description thereof.

The oscillator 283 oscillates at a normal frequency when the output signal from the comparator 282 is at a low level. However, when the output signal from the comparator 282 is at a high level, the oscillator 283 oscillates at a frequency twice the normal frequency.

The oscillation output signal from the discrimination/oscillation control circuit 28 is supplied to a flasher relay 29, thus controlling the relay 29. A contact 291 of the relay 29 is opened and closed in correspondence with the oscillation frequency.

The contact 291 is connected in series to a fixed resistor element 30. The series circuit of the resistor element 30 and the contact 291 is connected between the terminals 22 and 24 of the flasher unit 21. An ON current from the battery 23 is supplied to the switch 25 through the resistor element 30 and the contact 291, and is supplied to the signal 261 or 262. The signal selected by the switch 25 is controlled by the oscillation frequency.

Therefore, the ON current flows through the resistor element 30 to the signal. The resistor element 30 is used to detect the current flowing in the signal and constitutes a current-voltage converter. A voltage drop corresponding to the ON current occurs across the two ends of the resistor element 30, and a voltage signal corresponding thereto can be generated. The detecting voltage signal obtained by the resistor element 30 is supplied to the oscillation control circuit 28 as an input detection signal.

The signals 261 and 262 corresponding to right and left turn signal lights are each constructed by a plurality of lights. However, in the drawing of this embodiment, in order to simplify the description, each light is shown only once.

When no malfunction such as a disconnection occurs in the indicator signal lights 261 and 262 and they can therefore be normally operated, an ON current corresponding to a lamp load is supplied to the resistor element 30 upon selection of a light. Therefore, the voltage detected by the resistor element 30 changes to the specific value representing the normal operation mode. In this state, the comparator 282 consisting of the discrimination/oscillation control circuit 28 generates an output signal of a low level, and the oscillator 283 oscillates the signal having a normal flasher frequency. The lamp selected by the switch 25 flashes at a normal period.

Meanwhile, when at least one of the lights selected by the switch 25 is disconnected, the lamp load is decreased in comparison to the normal state. Therefore, the voltage value detected by the resistor element 30 is lower than normal and the output signal from the comparator 282 goes to a high level. In other words, the oscillation frequency of the oscillator 283 is controlled to oscillate at a frequency signal higher than normal, and the light which is not disconnected flashes at a shorter period than normal. Since flashing can also be indicated by, for example, a flasher indication monitor which is provided for the driver, the driver can know of the disconnection of the lamp by watching the flashing frequency of the monitor.

The resistance of the resistor element 30 must be precisely set so that the detection voltage is slightly higher than the normal reference voltage from the discrimination/oscillation control circuit 28, and the detection voltage is lower than the reference voltage upon disconnection of at least one lamp.

Figure 3:
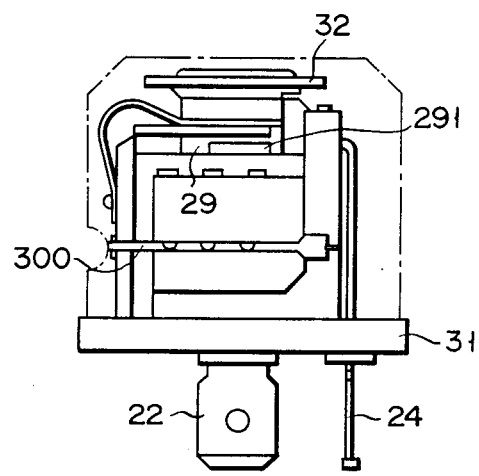
FIG. 3 is a view showing a lighting control apparatus in an assembled state.

FIG. 3 shows an assembled lighting control apparatus. The flasher relay 29 is mounted on a base circuit board 31, and a circuit board 32 comprising the discrimination/oscillation control circuit 28 is mounted on the relay 29. The terminal 22 connected to the battery, the output terminal 24 connected to the lamp circuit, and the ground terminal 27 are formed so as to project from the base circuit board 31. Note that in FIG. 3, the terminal 27 is provided behind the terminal 22 and so cannot be seen.

The resistor element 30 is formed from resistive wiring 300 which surrounds the relay 29 independent from the circuit board 32. The resistive wiring 300 is fixed by welding.

In the apparatus having such a configuration, there are variations in the welded portion of the resistive wiring 300 and in the reference voltage due to variations in the resistances of the resistors R1 and R2, which set the reference voltage and constitute the oscillation control circuit 28. In order to satisfactorily detect changes in the detection voltage caused by disconnection, the matching level of the resistance of the resistive wiring 300 and the reference voltage must be precise. For this reason, in this apparatus, after the circuit elements are completely assembled, that is, after the resistive wiring 300 is fixed by welding, the resistance of the resistive wiring 300 is adjusted, thus setting the level of the reference voltage.

Figure 4A:
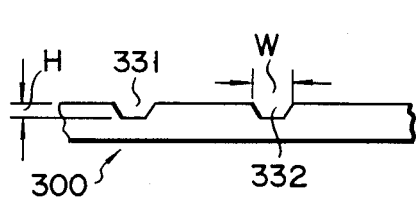
FIGS. 4a and 4b are respectively partial views showing a detecting resistor element used in the lighting control apparatus.

The resistive wiring which is used in this manner is shaped, for example, into a stick as shown in FIG. 4a. The wiring 300 is formed of a Cu-Ni alloy, Ni-Cr alloy, Cu-Mn-Ni alloy, Cu-Ni-Zn alloy or the like, and has a cross-section which imparts a smaller resistance than the target resistance.

One or more depressions 331, 332 ... are made in the outer surface of the resistive wiring 300 so as to obtain a smaller cross-section area than in the non-depressed portions. The overall resistance of the wiring 300 is increased in accordance with the width and depth of the depressed portions and the number of depressions.

Figure 5A:
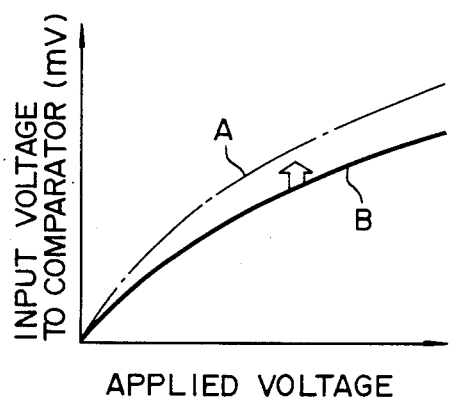
FIG. 5a is a graph for explaining the resistance of a resistive wiring constituting the resistor element in accordance with the relationship between an applied voltage from a battery and a voltage generated at the resistor element portion.

When the resistance of the resistive wiring 300 is adjusted upon connection, the power supply voltage is supplied and the reference voltage of the resistors R1 and R2 of the discrimination/oscillation control circuit 28 is compared with the voltage generated in the resistor element 30. The reference voltage, when the power supply voltage is changed, is measured to check if it has the characteristics indicated by curve A in FIG. 5a, and the voltage across the two ends of the resistor element 30 corresponding to changes in the power supply voltage is also measured. In this case, in the initial state, the resistance of the resistor element 30 is set to be slightly smaller than desired. The voltage generated across the two ends of the resistor element 30 has characteristics indicated by curve B in FIG. 5a. In this state, when the depression processing of the resistive wiring 300 is performed, curve B approaches curve A.

Figure 5B:
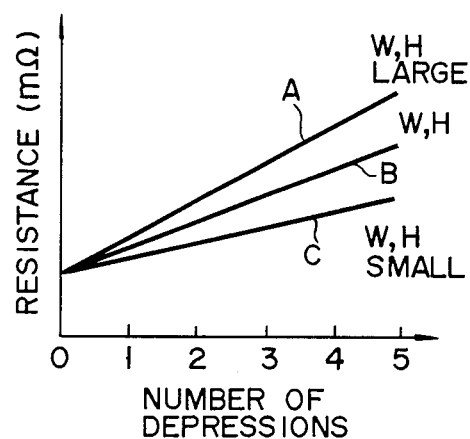
FIG. 5b is a graph explaining the relationship between the number of depressions in the resistor element and the resistance.

A change in the resistance is determined by a depression width W, depression depth H and the depression number, and the relationship between them are shown in FIG. 5b. In FIG. 5b, curves A, B and C respectively represent cases wherein the width W and the depth H are gradually decreased.

When the resistance of the resistor element 30 is set, the reference voltage of the discrimination/oscillation control circuit 28 is changed and the changed values are respectively measured. Then, from the initial resistance of the resistor element 30, the depression number, width and depth can be determined so as to correspond to the relationship shown in FIG. 5b.

In another method of adjustment, the flashers are operated at a predetermined voltage, and the current and the flashing frequency of the flashers are observed. Then, the depression number is increased until the flashing frequency changes.

Figure 4B:
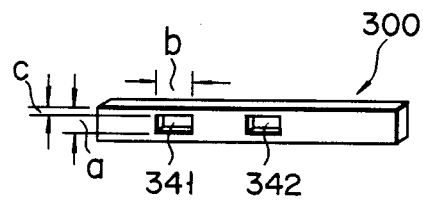

In this embodiment, the resistive wiring 300 is formed into a stick and the cross-section area thereof is changed by forming a series of depressions by a squeezing action or the like. However, the resistive wiring structure can also be a thin strip, as shown in FIG. 4b. The proper number of depressions 341, 342 is formed in the strip wiring 301, thereby changing and adjusting the cross-section area thereof. Therefore, the resistance of the wiring 301 can be adjusted by forming a desired number of these depressions 341, 342. The change in the resistance is determined by dimensions a and b of each depression 341 and by the remaining thickness c of that portion of wiring 301 in which the hole 341 is made.

Control of the resistance of the wirings 300 and 301 consisting of the resistor element 30 can be performed by grinding the outer surfaces of the wirings, where the outer surfaces of the wirings are ground by a grinder or the like upon observing the flashing frequency of the flasher lamps.

The above embodiment shows the lighting control apparatus for turn signal. However, such an apparatus can also be used as a disconnection detection apparatus for brake lights.

Figure 6:
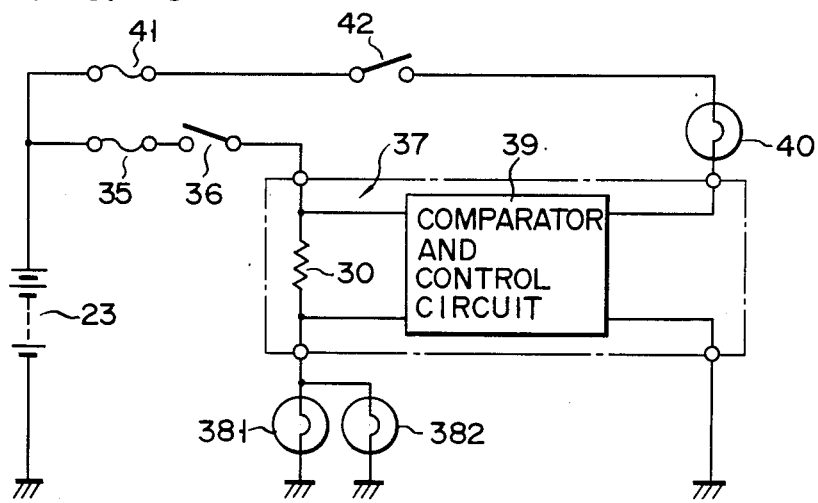
FIG. 6 is a circuit diagram explaining a second embodiment of the present invention.

FIG. 6 shows a configuration of a lighting control apparatus which can detect the disconnection of brake lights. A power supply 23 is electrically coupled to a disconnection detection circuit 37 through a brake switch 36. The disconnection detection circuit 37 also comprises the same detecting resistor element 30 as described above to which a power supply current is supplied through the switch 36. The current passing through the resistor element 30 is supplied to brake lights 381 and 382 as an ON current. When a brake pedal (not shown) is depressed, the brake switch 36 is turned on, thereby activating the brake lights 381 and 382. The resistor element 30 generates a detection voltage signal corresponding to that of the current.

The disconnection detection circuit 37 comprises a voltage comparator and control circuit 39 to which the voltage signal detected by the resistor element 30 is supplied. The voltage comparator and control circuit 39 comprises a comparator for comparing the detected voltage signal and a reference voltage. When the current flowing in the resistor element 30 is decreased and the detected voltage becomes lower than the reference voltage, the comparator generates an output signal. The output signal from the comparator controls a switching element such as a transistor, thereby controlling a disconnection warning signal 40.

The power supply 23 is electrically connected to the warning signal 40 through a fuse 41 and a key switch 42.

What is claimed is:

1. A lighting control apparatus for controlling signal lights via a signal light circuit, comprising:
    switching means for controlling a lighting state of the signal light by selectively switching an ON current to the signal light circuit;
    a detecting resistor means, which is formed of a continuous resistive wiring member having a cross-sectional area which can be selectively altered, for detecting a voltage signal corresponding to said ON current which is supplied to said signal light circuit through said switching circuit;
    discriminating means, having a predetermined reference voltage signal source, for comparing a reference voltage generated from said reference voltage signal source with a detection voltage signal generated by said detecting resistor means, and for discriminating a malfunction of said signal light circuit when said detection voltage signal is lower than the reference voltage, thereby performing an operation for signalling the malfunction; and
    resistance adjusting means for decreasing the cross-sectional area of said detecting resistor means by forming depressions therein.

2. An apparatus according to claim 1, wherein the cross-sectional area of said detecting resistor means is adjusted by comparing the reference voltage of said discriminating means with the detection voltage signal generated from said detecting resistor means after said resistor means is connected to a circuit board having said discriminating means.

3. An apparatus according to claim 2, wherein said detecting resistor means is connected to said circuit board by welding.

4. An apparatus according to claim 1, wherein said detecting resistor means consists of said resistive wiring member having a smaller overall resistance than a target overall resistance, and in which an outer shape of said resistive wiring member is modified by forming one or more depressions therein with said resistance adjusting means thereby decreasing a cross-sectional area thereof and thus increasing the resistance of said resistive wiring member.

5. An apparatus according to claim 4, wherein a width and a depth of a depressed portion of the resistive wiring member is controlled.

6. An apparatus according to claim 1, wherein the resistive wiring member constituting said detecting resistor means comprises a thin strip formed of a resistive material.

7. An apparatus according to claim 6, wherein the thin strip of said resistive wiring member has a smaller resistance than a final target resistance, and in which one or more depressions whose width and length are controlled are formed in said resistive wiring member and a cross-sectional area of said resistive wiring member is decreased, thereby increasing the resistance thereof.

8. An apparatus according to claim 1, wherein said signal light comprises a turn signal for a vehicle, said discriminating means includes an oscillator for oscillating a signal having a frequency corresponding to a flash of the flasher, and the flasher is controlled by a relay which is driven in response to the signal from said oscillator, said discriminating means including said oscillator being mounted on said circuit board, said circuit board being mounted integrally with said relay, and the resistive wiring member constituting said detecting resistor element being connected to said circuit board by welding.

9. An apparatus according to claim 8, wherein the resistive wiring member constituting said resistor element is arranged to surround said relay, and the resistive wiring member is processed in order to decrease the cross-sectional area thereof after being connected to said circuit board.

10. An apparatus according to claim 1, wherein said signal light comprises a brake light for a vehicle, said discriminating means compares the detection voltage signal obtained from said detecting resistor element and the reference voltage so that a signalling output signal is generated to perform a signalling display when the detection voltage signal becomes lower than the reference voltage.

11. Apparatus as in claim 1 wherein said resistive wiring member is a single strand of wire having a cross section which can be represented by a continuous geometric function.

12. An apparatus as in claim 1 wherein said resistor means is made from metal wire.

13. A method for detecting a malfunctioning signal light, comprising the steps of:
(a) forming a resistive element of a wiring member having a resistance differing from a desired resistance by a predetermined range, the desired resistance being a determined resistance which will allow detection of a signal light failure;
(b) testing the resistive element to accurately determine its resistance;
(c) determining a difference between the tested resistance and the desired resistance;
(d) determining an amount of cross-sectional deformation necessary to properly adjust the resistance of the resistive element so that the resistance coincides with the desired resistance;
(e) adjusting the resistance of the resistive elements by altering the cross-sectional area thereof according to said determination made in said determining step (d);
(f) again testing the resistance of the resistive element;
(g) repeating steps (e) and (f) until said again testing step indicates that the resistance of the resistive element differs from the desired resistance by less than a predetermined range;
(h) using the resistive element in a circuit connected to the signal lights;
(i) generating a reference voltage indicative of a normal voltage drop across the resistive element when the signal lights are operational;
(j) comparing the reference voltage with a voltage produced across the resistive element; and
(k) determining if a malfunction in the signal lights exists.

14. A method as in claim 13 wherein the resistive element is formed of a wire having a cross-section which is a continuous geometric function.

* * * * *